(12) United States Patent
Fujishiro et al.

(10) Patent No.: US 11,979,779 B2
(45) Date of Patent: May 7, 2024

(54) HANDOVER CONTROL METHOD, AND USER APPARATUS

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 435 days.

(21) Appl. No.: 17/244,660

(22) Filed: Apr. 29, 2021

(65) Prior Publication Data
US 2021/0250823 A1   Aug. 12, 2021

Related U.S. Application Data

(63) Continuation of application No. PCT/JP2019/040464, filed on Oct. 15, 2019.

(60) Provisional application No. 62/752,524, filed on Oct. 30, 2018.

(51) Int. Cl.
| | |
|---|---|
| *H04W 36/00* | (2009.01) |
| *H04W 36/04* | (2009.01) |
| *H04W 36/08* | (2009.01) |
| *H04W 36/36* | (2009.01) |
| *H04W 74/0833* | (2024.01) |

(52) U.S. Cl.
CPC ....... *H04W 36/0061* (2013.01); *H04W 36/04* (2013.01); *H04W 36/08* (2013.01); *H04W 36/36* (2013.01); *H04W 74/0833* (2013.01)

(58) Field of Classification Search
CPC . H04W 36/0061; H04W 36/04; H04W 36/08; H04W 36/36; H04W 74/0833

USPC ......................................................... 455/436
See application file for complete search history.

(56) References Cited

U.S. PATENT DOCUMENTS

| | | | |
|---|---|---|---|
| 11,678,238 B2* | 6/2023 | Chang ............... | H04W 36/0083 370/331 |
| 2018/0192347 A1* | 7/2018 | Shaheen ........... | H04W 36/0077 |
| 2018/0279193 A1 | 9/2018 | Park et al. | |
| 2019/0313309 A1* | 10/2019 | Tsuboi ................ | H04W 76/10 |
| 2020/0053600 A1* | 2/2020 | Jang .................. | H04W 28/0278 |

OTHER PUBLICATIONS

Conditional handover procedure; LG Electronics inc. 3GPP TSG-RAN2#101 R2-1802693; [Feb. 26-Mar. 2, 2018] (Year: 2018).*
Huawei, Hisilicon; "Further Discussion on Conditional HO"; 3GPP TSG-RAN2 Meeting #101; R2-1802472; Mar. 2, 2018; pp. 1-3; Athens, Greece.

(Continued)

*Primary Examiner* — Hirdepal Singh
(74) *Attorney, Agent, or Firm* — Studebaker & Brackett PC

(57) ABSTRACT

A handover control method is a method for performing a conditional handover of a user device from a source cell to a target cell, the source cell to which the user device connects. The handover control method comprises: receiving, by the user device from the source cell, a handover command including a list of candidate cells which are candidates for the target cell and a handover condition specified for each of the candidate cells in the list; and when a handover condition corresponding to a specific candidate cell in the list included in the received handover command is satisfied, performing a handover to the specific candidate cell in which the handover condition is satisfied.

8 Claims, 5 Drawing Sheets

(56) References Cited

OTHER PUBLICATIONS

Intel Corporation; "Discussion of Conditional Handover"; 3GPP TSG RAN WG2 Meeting #103bis; R2-1814051; Oct. 12, 2018; pp. 1-4; Chengdu, China.
ASTRI, TCL Communication Ltd .; "Discussion on Conditional Handover in NR"; 3GPP TSG-RAN WG2 Meeting #101; R2-1802008; Mar. 2, 2018; pp. 1-6; Athens, Greece.
ETRI; Consideration on Conditional Handover; 3GPP TSG-RAN WG2 Meeting #103bis; R2-1815244; Oct. 12, 2018; Section 2; Chengdu, China.
LG Electronics Inc.; "Conditional handover procedure"; 3GPP TSG-RAN 2; Meeting #101, R2-1802693; Feb. 26-Mar. 2, 2018; pp. 1-3; Athens, Greece.
Nokia, Nokia Shanghai Bell; "On the opportunities and threats of NR Conditional Handover", 3GPP TSG-RAN WG2 NR Ad-Hoc 1801, R2-1801099, Jan. 22-26, 2018, Vancouver, Canada, total 4 pages.

\* cited by examiner

---

HANDOVER CONTROL METHOD, AND USER APPARATUS

RELATED APPLICATIONS

The present application is a continuation based on PCT Application No. PCT/JP2019/040464, filed on Oct. 15, 2019, which claims the benefit of U.S. Provisional Application No. 62/752,524 filed on Oct. 30, 2018. The content of which is incorporated by reference herein in their entirety.

TECHNICAL FIELD

The present disclosure relates to a handover control method and a user device.

BACKGROUND ART

In a mobile communication system, a user device performs a handover that changes a cell, to which the user device itself connects, from a source cell to a target cell as the user device itself moves. In recent years, it has been desired to reduce a communication interruption time during the handover, and to improve reliability of the handover in an environment where a radio state is unstable.

SUMMARY

A handover control method according to a first embodiment is a method for performing a conditional handover of a user equipment from a source cell to a target cell, the source cell to which the user equipment connects. The handover control method comprises: receiving, by the user equipment from the source cell, a RRC message including a list of candidate cells which are candidates for the target cell and a handover condition specified for each of the candidate cells in the list; and when a handover condition corresponding to a specific candidate cell in the list included in the received RRC message is satisfied, performing a handover to the specific candidate cell in which the handover condition is satisfied. The RRC message further includes configuration which is used when the handover condition is satisfied. The configuration includes at least one of RLC configuration and MAC configuration.

A user equipment according to a second embodiment comprises when performing a conditional handover of the user equipment from a source cell to a target cell, the source cell to which the user equipment connects: a receiver configured to receive from the source cell, a RRC message including a list of candidate cells which are candidates for the target cell and a handover condition specified for each of the candidate cells in the list; and when a handover condition corresponding to a specific candidate cell in the list included in the received RRC message is satisfied, a controller configured perform a handover to the specific candidate cell in which the handover condition is satisfied. The RRC message further includes configuration which is used when the handover condition is satisfied. The configuration includes at least one of RLC configuration and MAC configuration.

A chipset according to a third embodiment is for controlling a user equipment. The chipset comprises: a processor and a memory coupled to the processor. The processor is configured to receiving, by the user equipment from the source cell, a RRC message including a list of candidate cells which are candidates for the target cell and a handover condition specified for each of the candidate cells in the list; and when a handover condition corresponding to a specific candidate cell in the list included in the received RRC message is satisfied, performing a handover to the specific candidate cell in which the handover condition is satisfied. The RRC message further includes configuration which is used when the handover condition is satisfied. The configuration includes at least one of RLC configuration and MAC configuration.

DESCRIPTION OF EMBODIMENTS

Figure 1:
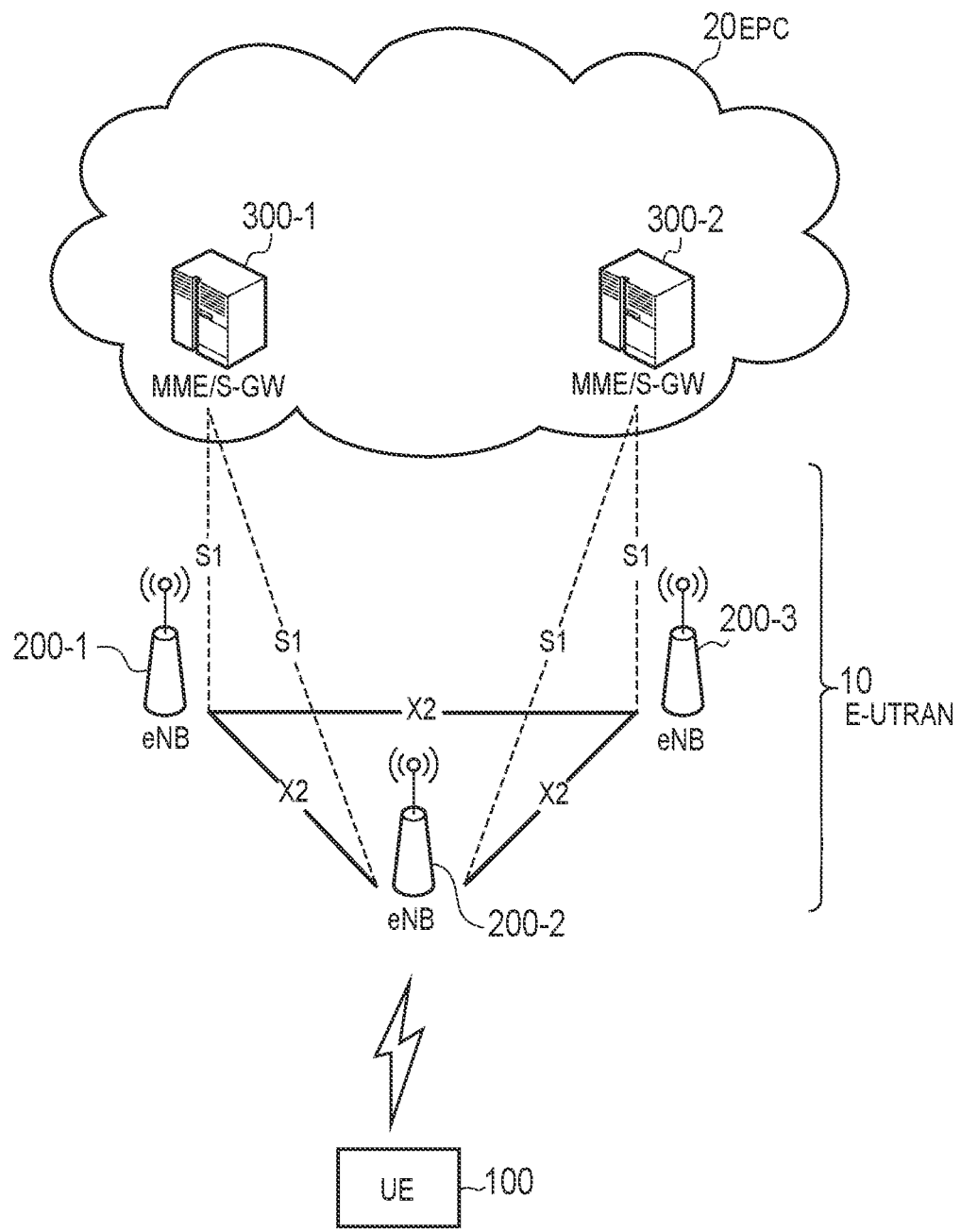
FIG. 1 is a diagram illustrating a configuration of a mobile communication system according to an embodiment.

A mobile communications system according to one embodiment will be described with reference to the drawings. In the description of the drawings, the same or similar reference numerals are assigned to the same or similar parts.

(A Configuration of a Mobile Communication System)

The configuration of a mobile communications system according to an embodiment will be described. FIG. 1 is a diagram illustrating a configuration of an LTE (Long Term Evolution) system which is the mobile communications system according to an embodiment. The LTE system is a system based on the 3GPP (3rd Generation Partnership Project) standard.

In the following, the LTE system is illustrated as the mobile communication system. However, a fifth generation (5G) mobile communication system based on the 3GPP standard may be at least partly applied to the mobile communication system.

As shown in FIG. 1, the LTE system is provided with a user device (user equipment: UE) 100, a radio access network (evolved-UMTS terrestrial radio access network: E-UTRAN) 10, and a core network (evolved packet core: EPC) 20.

In the 5G system, the radio access network is referred to as NG-RAN (Next Generation RAN), and the core network is referred to as 5GC (5G Core Network).

The UE 100 is a mobile-type communication apparatus. The UE 100 performs radio communications with an eNB 200 that manages the cell (serving cell) in which the UE 100 exists. The UE 100 may be any device as long as it is a device that is used by a user. For example, the UE 100 is a mobile phone terminal (including a smart phone), a tablet terminal, a notebook PC, a sensor, a device installed in the sensor, a vehicle, a device installed in vehicle (Vehicle UE), an airplane, or a device installed in airplane (Aerial UE).

The E-UTRAN 10 includes base stations (evolved Node-B: eNB) 200. The eNB 200 are interconnected via an X2 interface which is an interface between base stations. The eNB 200 manage one or a plurality of cells. The eNB 200 perform radio communications with the UEs 100 that have established a connection with their own cells. The eNB 200 have a radio resource management (RRM) function, a user data (hereinafter simply called "data") routing function, and a measurement control function for mobility control and scheduling, and the like. "Cell" is used as a term indicating the smallest unit of a radio communications area. "Cell" is also used as a term indicating a function or resource that performs radio communications with the UE 100. One cell belongs to one carrier frequency.

In the 5G system, the base station is referred to as gNB, and the interface between base stations is referred to as Xn. Note that the gNB can connect to the EPC, the eNB can connect to the 5GC, and the gNB and the eNB can connect via the interface between base stations (Xn interface, X2 interface).

The EPC 20 includes a mobility management entity (MME) and serving gateway (S-GW) 300. The MME performs various mobility control with respect to the UE 100, and the like. The MME manages information of a tracking area (TA) in which the UE 100 exists by using non-access stratum (NAS) signaling to communicate with the UE 100. The tracking area is an area comprising a plurality of cells. The S-GW performs data transfer control. The MME and S-GW are connected to the eNB 200 via an S1 interface which is an interface between the base station and the core network.

In the 5G system, the core network entity, which performs various mobility control with respect to the UE 100, and the like, is referred to as AMF (Access and Mobility Management Function). The core network entity, which performs data transfer control, is referred to as UPF (User Plane Function). The interface between the base station and the core network is referred to as NG interface.

Figure 2:
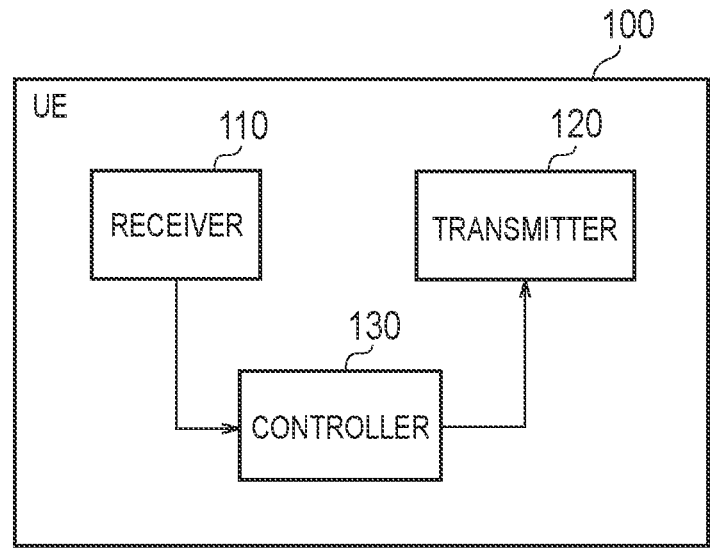
FIG. 2 is a diagram illustrating a configuration of a user device according to the embodiment.

FIG. 2 is a diagram illustrating a configuration of the UE 100 (user device). As shown in FIG. 2, the UE 100 is provided with a receiver 110, a transmitter 120, and a controller 130.

The receiver 110 performs various reception under the control of the controller 130. The receiver 110 includes an antenna and a receiving set. The receiving set converts a radio signal received by the antenna to a baseband signal (reception signal) and outputs the baseband signal to the controller 130.

The transmitter 120 performs various transmission under the control of the controller 130. The transmitter 120 includes an antenna and a transmitting set. The transmitting set converts the baseband signal (transmission signal) output by the controller 130 to a radio signal and transmits the radio signal from the antenna.

The controller 130 performs various control of the UE 100. The controller 130 includes at least one processor and at least one memory. The memory stores a program executed by the processor and information used in processing by the processor. The processor may include a baseband processor and a central processing unit (CPU). The baseband processor performs modulation/demodulation and coding/decoding of baseband signals, and the like. The CPU performs various processing by executing the program stored in the memory. The processor executes processing that will be described subsequently.

Figure 3:
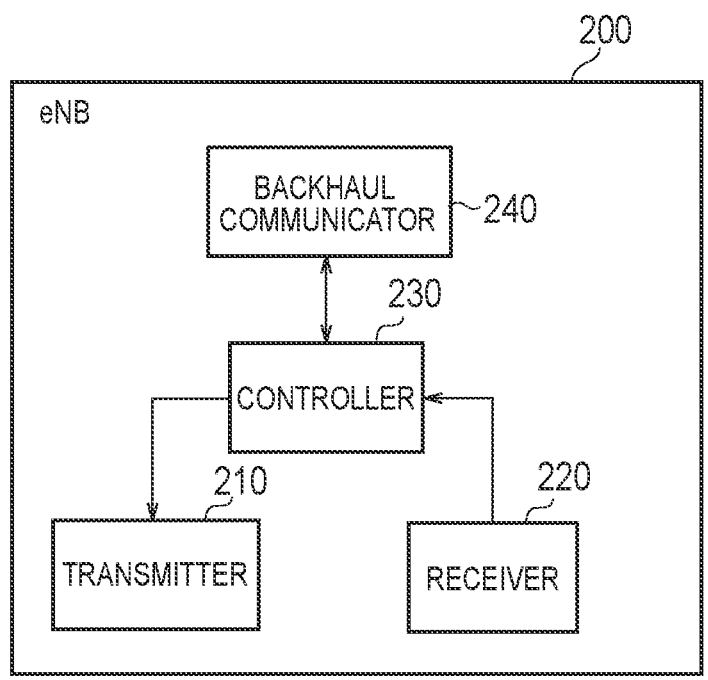
FIG. 3 is a diagram illustrating a configuration of a base station according to the embodiment.

FIG. 3 is a diagram illustrating a configuration of the eNB 200 (base station). The eNB 200 is provided with a transmitter 210, a receiver 220, a controller 230, and a backhaul communicator 240.

The transmitter 210 performs various transmission under the control of the controller 230. The transmitter 210 includes an antenna and a transmitting set. The transmitting set converts the baseband signal (transmission signal) output by the controller 230 to a radio signal and transmits the radio signal from the antenna.

The receiver 220 performs various receptions under the control of the controller 230. The receiver 220 includes an antenna and a receiving device. The receiving device converts a radio signal received by the antenna into a baseband signal (received signal) and outputs the baseband signal to the controller 230.

The controller 230 performs various controls in the eNB 200. The controller 230 includes at least one processor and at least one memory. The memory stores a program executed by the processor and information used for processing by the processor. The processor may include a baseband processor and a CPU. The baseband processor performs modulation/demodulation, encoding/decoding, and the like of the baseband signal. The CPU performs a variety of processing by executing programs stored in the memory. The processor executes processing to be described later.

The backhaul communicator 240 is connected to an adjacent eNB or an adjacent gNB via an interface between base stations (X2 interface or Xn interface). The backhaul communicator 240 is connected to an MME/S-GW 300 or AMF/UPF via an interface between base station and core network (S1 interface or NG interface).

Figure 4:
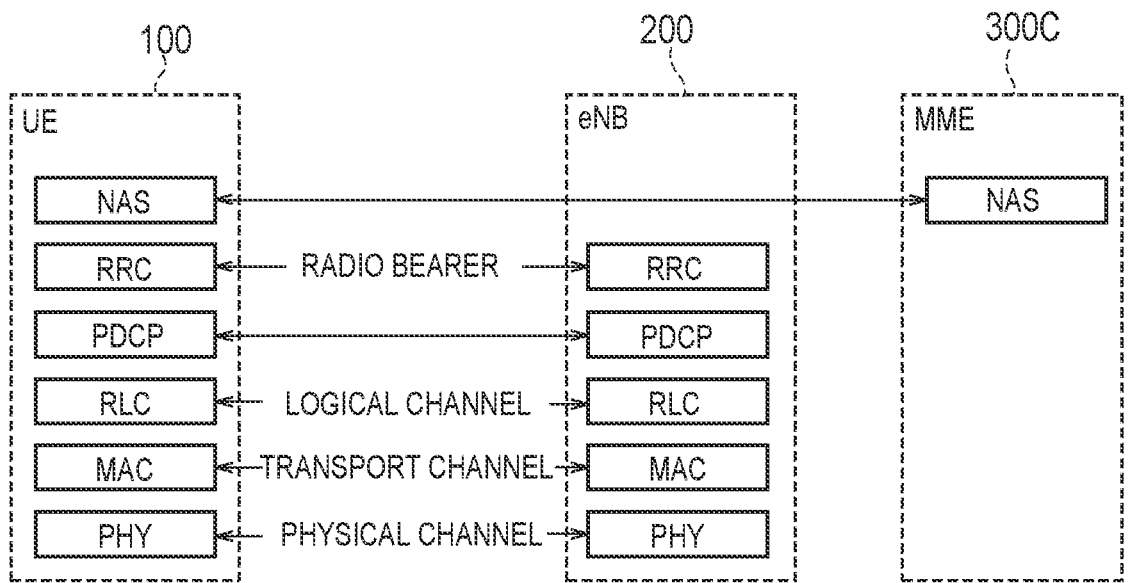
FIG. 4 is a diagram illustrating a configuration of a protocol stack of a radio interface according to the embodiment.

FIG. 4 is a diagram illustrating a configuration of a protocol stack of a radio interface in the LTE system. As illustrated in FIG. 4, a radio interface protocol is divided into a first layer to a third layer of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs coding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs data priority control, retransmission processing using hybrid ARQ (HARQ), and random access procedures, and the like. Data and control information are transmitted between the MAC layer of the UE 100 and the MAC layer of the eNB 200 via a transport channel. The MAC layer of the eNB 200 includes a scheduler. The scheduler determines the transport format (transport block size, modulation/coding system (MCS)) of uplinks and downlinks, and the resource blocks allocated to the UE 100.

The RLC layer uses the functions of the MAC layer and PHY layer to transmit data to the RLC layer on the receiving side. Data and control information are transmitted between the RLC layer of the UE 100 and the RLC layer of the eNB 200 via a logical channel.

The PDCP layer performs header compression/extension and encryption/decoding.

The RRC layer is defined only by a control plane that handles the control information. RRC signaling for various configuration is transmitted between the RRC layer of the UE 100 and the RRC layer of the eNB 200. The RRC layer controls the logical channel, transport channel, and physical channel according to the establishment, re-establishment, and release of a radio bearer. If there is a connection (RRC connection) between the RRC of the UE 100 and the RRC of the eNB 200, the UE 100 is in an RRC connected mode. When there is no connection (RRC connection) between the RRC of the UE 100 and the RRC of the eNB 200, the UE 100 is in an RRC idle mode.

A NAS layer, which is located on top of the RRC layer, performs session management and mobility management, and the like. NAS signaling is transmitted between the NAS layer of the UE 100 and the NAS layer of an MME 300C. Besides a radio interface protocol, the UE 100 has an application layer function or another such function.

In the 5G system, a Service Data Adaptation Protocol (SDAP) layer is provided upper the PDCP layer. The SDAP layer performs mapping between an IP flow, which is a unit for which the core network performs QoS control, and a radio bearer which is a unit for which Access Stratum (AS) performs QoS control.

Figure 5:
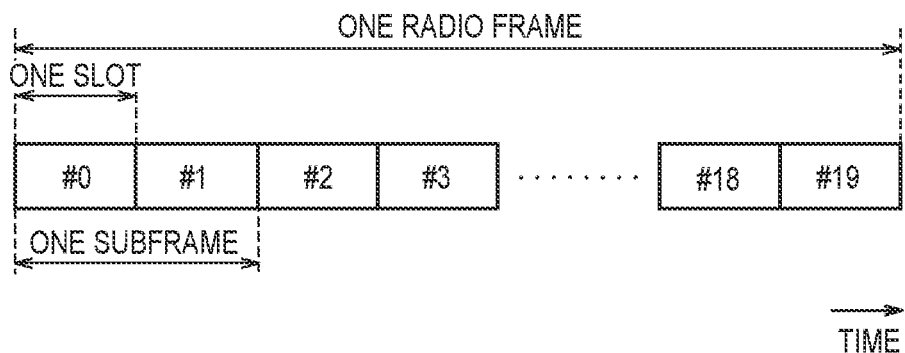
FIG. 5 is a diagram illustrating a configuration of a radio frame according to the embodiment.

FIG. 5 is a diagram illustrating a configuration of a radio frame used in an LTE system. The radio frame is configured from ten subframes on a time axis. The subframes are each configured from two slots on the time axis. The length of each subframe is 1 ms. The length of each slot is 0.5 ms. Each subframe contains a plurality of resource blocks (RB) on a frequency axis. Each subframe contains a plurality of symbols on the time axis. Each resource block contains a plurality of subcarriers on the frequency axis. More specifically, one RB is configured from twelve subcarriers and one slot. One resource element (RE) is configured from one symbol and one subcarrier. Among the radio resources (time/frequency resources) allocated to the UE 100, the frequency resources can be specified by means of resource blocks and the time resources can be specified by means of subframes (or slots).

In a downlink, an interval of the first few symbols of each subframe is a region mainly used as a physical downlink control channel (PDCCH) for transmitting downlink control information. The remainder of each subframe is a region that can be used mainly as a physical downlink shared channel (PDSCH) for transmitting downlink data.

In an uplink, both ends in the frequency direction of each subframe are regions which are mainly used as a physical uplink control channel (PUCCH) for transmitting uplink control information. The remainder of each subframe is a region that can be used mainly as a physical uplink shared channel (PUSCH) for transmitting uplink data.

(Operation of Mobile Communication System)

Next, an operation of the mobile communication system according to the embodiment will be described. Although an LTE system will be described as an example, the operation may be applied to a 5G system, in which case eNB may be read as gNB, and an X2 interface may be read as an Xn interface.

(1) Overview of Conditional Handover

In a general handover procedure, the eNB 200 determines the handover of the UE 100. For example, the UE 100 transmits, to a source cell, a measurement report regarding a radio state in response to that a radio state between the UE 100 and the source cell turns worse, and/or that a radio state between the UE 100 and a target cell turns better.

Note that the handover of the UE 100 is an operation of switching a serving cell of the UE 100 from the source cell to the target cell. In the following, an example in which the source cell and the target cell belong to different eNBs will be described; however, the source cell and the target cell may belong to the same eNB.

A source eNB 200 that manages the source cell determines the handover of the UE 100 on the basis of the measurement report transmitted from the UE 100, and transmits a handover request including a UE context to a target eNB that manages the target cell. Then, upon receiving a handover request acknowledgement from the target eNB, the source eNB 200 transmits a handover command to the UE 100. Upon receiving the handover command, the UE 100 starts the handover to the target eNB, and transmits a random access signal to the target eNB.

On the other hand, in a procedure of the conditional handover, the UE 100 itself determines the handover of the UE 100. Specifically, the source eNB 200 transmits a handover request in advance to a candidate eNB that manages a candidate cell that is a candidate for the target cell. Here, the number of such candidate eNBs is not limited to one, and may be plural. Therefore, a plurality of the candidate eNBs can receive the handover request.

The source eNB 200 transmits the handover command to the UE 100 in advance. After receiving the handover command, the UE 100 suspends the handover until a handover condition is satisfied, starts the handover when the handover condition is satisfied, and transmits the random access signal to one candidate eNB.

In such a conditional handover, the source eNB 200 does not make a determination of the handover, which is based on the measurement report, but the UE 100 itself determines the handover. Therefore, even if the radio state between the UE 100 and the source eNB 200 is unstable, the handover is performed immediately according to the radio state, whereby reliability (robustness) of the handover can be improved.

In the embodiment, from the source cell (source eNB 200), the UE 100 receives the handover command including a list (hereinafter, referred to as a cell list) of the candidate cells, which are candidates for the target cell, and the handover condition specified for each candidate cell in the cell list. When a handover condition corresponding to a specific candidate cell in the cell list included in the received handover command is satisfied, the UE 100 performs the handover to the specific candidate cell in which the handover condition is satisfied.

As described above, the cell list is included in the handover command. A method is also conceivable, in which the source eNB 200 predicts a moving direction of the UE 100 to determine only one cell in a destination as the candidate cell; however, such a method has a problem of being incapable of performing the conditional handover when the prediction is wrong. In the embodiment, since the cell list is included in the handover command, such a problem can be easily solved.

Moreover, the handover condition is specified for each candidate cell, whereby the handover condition can be specified in detail according to an attribute (for example, a type and size of the cell) of the candidate cell.

Note that, in the following, the source eNB 200 will be referred to as "source eNB 200S", and the candidate eNB will be referred to as "candidate eNB 200T".

(2) Example of Operation Sequence

Figure 6:
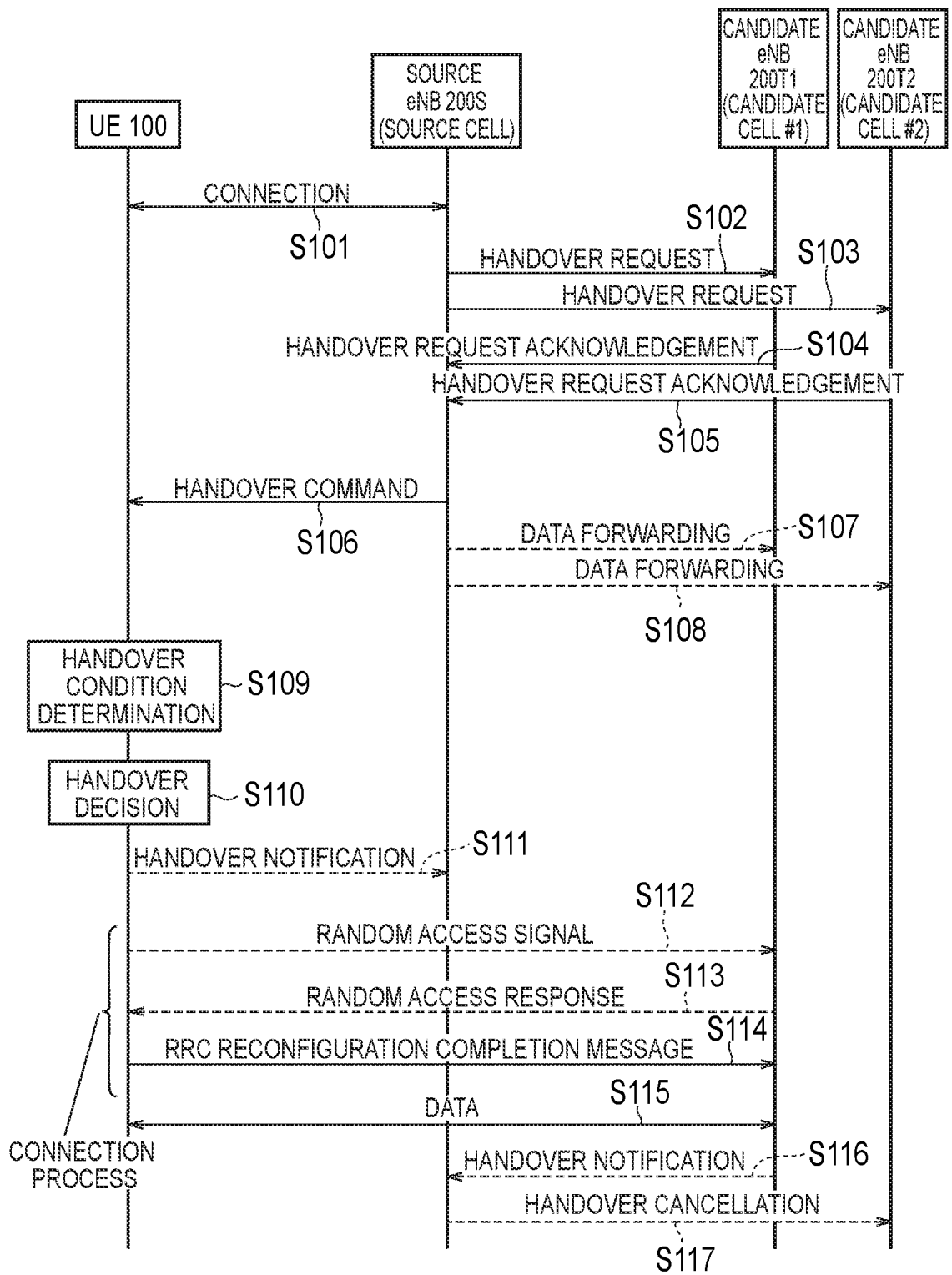
FIG. 6 is a diagram illustrating an operation sequence of the mobile communication system according to the embodiment.

FIG. 6 is a diagram illustrating an operation sequence of the mobile communication system according to the embodiment. Note that signaling illustrated by broken lines in FIG. 6 is not essential.

As illustrated in FIG. 6, in step S101, the UE 100 in the RRC connected mode establishes a radio connection (RRC connection) with the cell (source cell) of the source eNB 200S.

The source eNB 200S determines the candidate cell (candidate eNB 200T) that is the candidate for the target cell when the UE 100 is handed over. The candidate eNB 200T may be an adjacent eNB adjacent to the source eNB 200S. The source eNB 200S may determine the candidate eNB 200T when the UE 100 connects to its own cell, and may transmit the handover request to the candidate eNB 200T. The source eNB 200S may transmit the handover request to a plurality of eNBs (plurality of candidate eNBs). Here, it is assumed that the source eNB 200S determines a cell of a candidate eNB 200T1 and a cell of a candidate eNB 200T2 as such candidate cells. In the following, the cell of the candidate eNB 200T1 will be referred to as a candidate cell #1, and the cell of the candidate eNB 200T2 is referred to as a candidate cell #2.

In step S102, the source eNB 200S transmits a handover request message for the conditional handover to the candidate eNB 200T1 on an inter-base station interface (X2 interface).

Moreover, in step S103, the source eNB 200S transmits a handover request message for the conditional handover to the candidate eNB 200T2 on the inter-base station interface (X2 interface).

The handover request message includes the UE context. The handover request message may be a new message dedicated to the conditional handover. Alternatively, the handover request message may be an existing handover request message including information (information elements) indicating the conditional handover.

Each of the candidate eNB 200T1 and the candidate eNB 200T2 receives the handover request message from the source eNB 200S, and holds the UE context included in the handover request message.

In step S104, the candidate eNB 200T1 transmits the handover request acknowledgment (Ack) message to the source eNB 200S on the X2 interface.

The handover request ACK message transmitted by the candidate eNB 200T1 includes a radio communication configuration determined by the candidate eNB 200T1. The radio communication configuration is a configuration to be applied to radio communication with the candidate eNB 200T1 when the UE 100 hands over to the candidate eNB 200T1. The radio communication configuration may include a configuration for each layer. For example, the radio communication configuration may include at least one of PDCP configuration, RLC configuration, MAC configuration, and PHY configuration.

The handover request ACK message transmitted by the candidate eNB 200T1 may include information for the UE 100 to omit a random access procedure for the candidate eNB 200T1. Such information includes timing advance information and/or uplink radio resource information. The timing advance information is information indicating a timing advance value (TA value) to be applied when the UE 100 performs uplink transmission to the candidate eNB 200T1. The uplink radio resource information is information indicating an uplink radio resource (time/frequency resource) which the UE 100 should use when performing uplink transmission to the candidate eNB 200T1. The uplink radio resource information is sometimes referred to as an uplink grant (UL grant). The uplink radio resource information may further include information indicating a modulation and coding system (MCS) to be applied to the uplink transmission.

In step S105, the candidate eNB 200T2 transmits the handover request ACK message to the source eNB 200S on the X2 interface.

The handover request ACK message transmitted by the candidate eNB 200T2 may include information (information elements) similar to the handover request ACK message transmitted by the candidate eNB 200T1. That is, the handover request ACK message transmitted by the candidate eNB 200T2 includes a radio communication configuration determined by the candidate eNB 200T2. The handover request ACK message transmitted by the candidate eNB 200T2 may include the timing advance information and/or the uplink radio resource information as information for the UE 100 to omit a random access procedure for the candidate eNB 200T2.

The source eNB 200S receives these handover request ACK messages, thereby acquiring the radio communication configuration from each candidate eNB 200. Moreover, the source eNB 200S acquires the timing advance information and/or the uplink radio resource information.

In step S106, the source eNB 200S transmits, to the UE 100, the handover command (for example, an RRC connection reconfiguration message) including the information (information elements) regarding the conditional handover.

Figure 7:
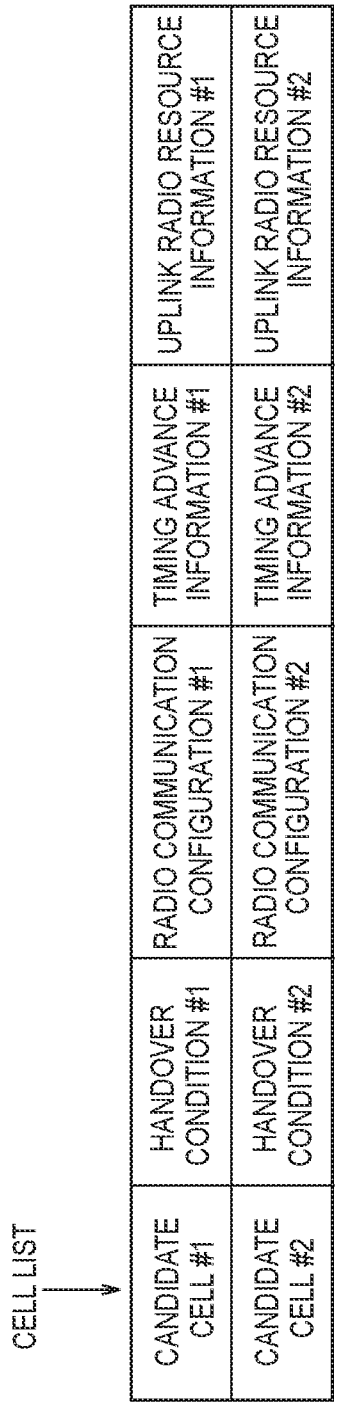
FIG. 7 is a diagram showing information (information elements) included in a handover command according to the embodiment.

FIG. 7 is a diagram showing an example of the information (information elements) included in the handover command according to the embodiment.

As shown in FIG. 7, the handover command transmitted to the UE 100 by the source eNB 200S includes the list (cell list) of the candidate cells. The cell list is a list composed of identifiers (for example, physical cell identifiers) of respective candidate cell #1 and #2. Here, an example in which the number of candidate cells in the cell list is two is shown; however, the number of candidate cells may be three or more.

The handover command transmitted to the UE 100 by the source eNB 200S includes a handover condition specified for each candidate cell in the cell list. The handover condition is, for example, a condition that the radio state between the UE 100 and the source eNB 200 (source cell) turns worse, and/or that the radio state between the UE 100 and the candidate eNB (candidate cell) turns better. The handover condition may include at least one of a first threshold value compared with the radio state of the source cell and a second threshold value compared with the radio state of the candidate cell. For example, the radio state may be received reference signal quality (RSRP, RSRQ, RS-SINR, and the like), or may be the number of packet retransmissions (the number of RLC retransmissions, and the like).

Moreover, the handover command transmitted to the UE 100 by the source eNB 200S includes a radio communication configuration specified for each candidate cell in the cell list.

Furthermore, the handover command may further include the timing advance information and/or the uplink radio resource information, which is specified for each candidate cell in the cell list. When such information is included, the handover command may further include information indicating that it is possible to omit the random access procedure for the corresponding candidate cell.

Moreover, the handover command may further include information that specifies a time (valid period) during which the handover command is valid.

In steps S107 and S108, the source eNB 200 starts to transfer a copy of downlink data of the UE 100 to the candidate eNB 200T1 and the candidate eNB 200T2, which manage the candidate cells in the cell list, before the UE 100 performs the handover. That is, the source eNB 200 starts a transfer process (so-called data forwarding) of the copy of the downlink data.

In step S109, upon receiving the handover command from the source eNB 200S, the UE 100 determines whether or not any of the handover conditions included in the received handover command is satisfied. For example, the UE 100 measures the radio states of the source eNB 200S (source cell) and each candidate eNB 200T, and compares the radio states with the threshold value to determine whether or not the handover condition is satisfied.

In step S110, when a handover condition corresponding to a specific candidate cell in the cell list is satisfied, the UE 100 decides to perform the handover to the specific candidate cell in which the handover condition is satisfied. Here, the description will proceed on the assumption that the handover condition corresponding to the candidate eNB 200T1 (candidate cell #1) is satisfied.

In step S111, the UE 100 may transmit, to the source eNB 200S, a notification (handover notification) indicating execution of the handover. On the basis of such a notification, the source eNB 200S grasps that the UE 100 will perform the handover. The notification of the handover execution may include information indicating a cell selected as a handover destination by the UE 100.

In step S112, the UE 100 starts the random access procedure for the candidate cell #1 (candidate eNB 200T1) selected as the handover destination, and transmits the random access signal to the cell.

In step S113, the candidate eNB 200T1 calculates the timing advance on the basis of a random signal, determines the uplink radio resource to be allocated to the UE 100, and transmits, to the UE 100, a random access response including information of the calculated timing advance and the determined uplink radio resource.

Here, when the timing advance information and/or the uplink radio resource information (UL grant), which corresponds to the candidate cell #1, is included in the handover command, the UE 100 may omit the random access procedure for the candidate cell #1 (candidate eNB 200T1), that is, the transmission of the random access signal (step S112) and the reception of the random access response (step S113). Here, the description will proceed on the assumption that the UE 100 omits the random access procedure.

In step S114, when performing the handover to the candidate cell #1 (candidate eNB 200T1), then using the timing advance information and/or the uplink radio resource information, which corresponds to the candidate cell #1, the UE 100 omits the transmission of the random access signal to the candidate cell #1, and transmits the uplink message to the candidate cell #1. Here, the uplink message may be an RRC reset completion message which is a kind of the RRC message. Thus, the connection process between the UE 100 and the candidate cell #1 (candidate eNB 200T1) is completed, and the handover is completed.

In step S115, when the handover is completed, the UE 100 transmits/receives data to/from the candidate cell #1 (candidate eNB 200T1) using the radio communication configuration corresponding to the candidate cell #1 (candidate eNB 200T1), the radio communication configuration being included in the handover command. The candidate eNB 200T1 may transmit, to the UE 100, the downlink data previously transferred from the UE 100 by the data forwarding.

In step S116, the candidate eNB 200T1 may transmit a handover notification, which indicates that the UE 100 has handed over (connected) to the candidate eNB 200T1, to the source eNB 200S on the X2 interface.

In step S117, the source eNB 200S may notify the candidate eNB 200T2 of handover cancellation in response to the reception of the handover notification from the candidate eNB 200T1. The candidate eNB 200T2 may discard the UE context, which is included in the handover request (step S103) and held by the candidate eNB 200T2, in response to the reception of the handover cancellation.

As described above, in a handover control method for performing the conditional handover of the UE 100 from the source cell to the target cell, the source cell accepting the connection of the UE 100, the UE 100 receives, from the source cell, the handover command including the list (cell list) of the candidate cells which are the candidates for the target cell and the handover condition specified for each of the candidate cells in the cell list. When the handover condition corresponding to the specific candidate cell (candidate cell #1) in the cell list included in the received handover command is satisfied, the UE 100 performs the handover to the specific candidate cell (candidate cell #1) in which the handover condition is satisfied.

As described above, the handover condition is specified for each candidate cell, whereby the handover condition can be specified in detail according to the attribute (for example, the type and size of the cell) of the candidate cell.

In the embodiment, the handover command further includes the radio communication configuration specified for each candidate cell in the cell list. After connecting to the specific candidate cell (candidate cell #1), the UE 100 performs radio communication with the specific candidate cell (candidate cell #1) using the radio communication configuration corresponding to the specific candidate cell (candidate cell #1).

In the embodiment, the source eNB 200S that manages the source cell acquires the radio communication configuration from the candidate eNB 200T that manages the candidate cells in the cell list. The source eNB 200S transmits, to the UE 100, the handover command including the radio communication configuration acquired from the candidate eNB 200T.

Thus, radio communication can be appropriately performed after the conditional handover.

In the embodiment, the handover command may further include the timing advance information and/or the uplink radio resource information, which is specified for each candidate cell in the cell list. When performing the handover to the specific candidate cell (candidate cell #1), then using the timing advance information and/or the uplink radio resource information, which corresponds to the specific candidate cell (candidate cell #1), the UE 100 omits the transmission of the random access signal to the specific candidate cell (candidate cell #1), and transmits the uplink message to the specific candidate cell (candidate cell #1).

In the embodiment, the source eNB 200S that manages the source cell acquires the timing advance information and/or the radio resource information from the candidate eNB 200T that manages the candidate cells in the cell list. The source eNB 200S transmits, to the UE 100, the handover command including the timing advance information and/or the radio resource information, which is acquired from the candidate eNB 200T.

Thus, the random access procedure can be omitted at the time of the conditional handover.

In the embodiment, before the UE 100 performs the handover, the source eNB 200S that manages the source cell starts to transfer the copy of the downlink data of the user device to the candidate eNB 200T that manages the candidate cells in the cell list.

Thus, the candidate eNB 200T can promptly start the downlink data transmission after the conditional handover.

Other Embodiments

In the above-mentioned embodiment, the description has been given of the example of transmitting the handover command, which includes the uplink radio resource information, from the source eNB 200S to the UE 100. However, when each candidate eNB 200T broadcasts the uplink radio resource information by System Information Block (SIB), the UE 100 may receive the uplink radio resource information from each candidate eNB 200T, and on the basis of the received uplink radio resource information, may omit the random access procedure (steps S112 and S113 in FIG. 6, and may transmit the uplink message (step S114 in FIG. 6).

A program that causes a computer to execute each process executed by the UE 100 (or the eNB 200) may also be provided. Furthermore, the program may also be recorded on a computer-readable medium. If a computer-readable medium is employed, the program can be installed on a computer. Here, the computer-readable medium whereon the program is recorded may also be a non-transitory recording medium. A non-transitory recording medium is not particularly limited and may be a recording medium such as a CD-ROM or DVD-ROM, for example.

Further, a circuit that executes each process performed by the UE 100 (or eNB 200) may be integrated, and at least a part of the UE 100 (or eNB 200) may be configured as a semiconductor integrated circuit (chipset, SoC).

Although the embodiments have been described in detail with reference to the drawings, the specific configuration is not limited to the above, and various design changes and the like can be made without departing from the gist.

The invention claimed is:

1. A handover control method for performing a conditional handover of a user equipment from a source cell to a target cell, the source cell to which the user equipment connects, the handover control method comprising:
   receiving, by the user equipment from the source cell, a RRC message including a list of candidate cells which are candidates for the target cell and a handover condition specified for each of the candidate cells in the list; and
   when a handover condition corresponding to a specific candidate cell in the list included in the received RRC message is satisfied, performing a handover to the specific candidate cell in which the handover condition is satisfied, wherein
   the RRC message further includes configuration which is used when the handover condition is satisfied,
   the configuration includes at least one of RLC configuration and MAC configuration,
   the RRC message includes a first threshold value compared with a radio state of the source cell and a second threshold value compared with a radio state of the candidate cell, and
   the handover condition is satisfied when the radio state of the source cell is worse than the first threshold value and the radio state of the candidate cell is better than the second threshold value; and
   the handover control method further comprises:
   acquiring, by a source base station which manages the source cell, the configuration from a candidate base station which manages the candidate cell in the list; and
   transmitting, by the source base station to the user equipment, the RRC message including the configuration acquired from the candidate base station.

2. The handover control method according to claim 1, further comprising:
   starting, by a source base station which manages the source cell, transfer of a copy of downlink data of the user equipment to a candidate base station which manages the candidate cell in the list before the user equipment performs the handover.

3. The handover control method according to claim 1, further comprising:
   transmitting, by the specific candidate cell to a source base station which manages the source cell, a handover notification indicating that the handover is completed; and
   transmitting, by the source base station handover cancellation to another candidate cell in the list in response to reception of the handover notification.

4. The handover control method according to claim 1, wherein
   after connecting to the specific candidate cell, the user equipment performs radio communication with the specific candidate cell using the configuration corresponding to the specific candidate cell.

5. The handover control method according to claim 1, wherein
   the RRC message further includes timing advance information specified for each of the candidate cells in the list and/or uplink radio resource information specified for each of the candidate cells in the list, and
   when performing the handover to the specific candidate cell, the user equipment omits transmission of a random access signal to the specific candidate cell, and transmits an uplink message to the specific candidate cell using the timing advance information specified for each of the candidate cells in the list and/or the uplink radio resource information specified for each of the candidate cells in the list.

6. The handover control method according to claim 5, further comprising:
   acquiring, by a source base station which manages the source cell, the timing advance information and/or the radio resource information from a candidate base station which manages the candidate cells in the list; and
   transmitting, by the source base station to the user equipment, the RRC message including the timing advance information acquired from the candidate base station and/or the radio resource information acquired from the candidate base station.

7. The handover control method according to claim 1, wherein
   the RRC message further includes information which specifies a time during which the RRC message is valid.

8. A system for performing a conditional handover of a user equipment from a source cell to a target cell, the system comprising:
   the user equipment comprising:
   a receiver configured to receive from the source cell, a RRC message including a list of candidate cells which are candidates for the target cell and a handover condition specified for each of the candidate cells in the list; and
   a controller configured such that when a handover condition corresponding to a specific candidate cell in the list included in the received RRC message is satisfied, the controller performs a handover to the specific candidate cell in which the handover condition is satisfied, wherein
   the RRC message further includes configuration which is used when the handover condition is satisfied,
   the configuration includes at least one of RLC configuration and MAC configuration, the RRC message includes a first threshold value compared with a radio state of the source cell and a second threshold value compared with a radio state of the candidate cell, and the handover condition is satisfied when the radio state of the source cell is worse than the first threshold value and the radio state of the candidate cell is better than the second threshold value; and a source base station configured to, manage the source cell, acquires the configuration from a candidate base station which manages the candidate cell in the list, and transmit to the user equipment the RRC message including the configuration acquired from the candidate base station.

* * * * *